United States Patent
Avsar

(10) Patent No.: US 10,144,393 B2
(45) Date of Patent: Dec. 4, 2018

(54) WINDSCREEN WIPER

(75) Inventor: Erdal Avsar, Kocaeli (TR)

(73) Assignee: MITSUBA TEKLAS TURKEY OTOMOTIV ANONIM SIRKETI, Gebze-Kocaeli (TR)

( * ) Notice: Subject to any disclaimer, the term of this patent is extended or adjusted under 35 U.S.C. 154(b) by 383 days.

(21) Appl. No.: 14/421,090

(22) PCT Filed: Aug. 13, 2012

(86) PCT No.: PCT/IB2012/054109
§ 371 (c)(1),
(2), (4) Date: Feb. 11, 2015

(87) PCT Pub. No.: WO2014/027217
PCT Pub. Date: Feb. 20, 2014

(65) Prior Publication Data
US 2015/0197217 A1 Jul. 16, 2015

(51) Int. Cl.
*B60S 1/38* (2006.01)
*B60S 1/40* (2006.01)

(52) U.S. Cl.
CPC .......... *B60S 1/3868* (2013.01); *B60S 1/3867* (2013.01); *B60S 1/4048* (2013.01); *B60S 2001/4054* (2013.01)

(58) Field of Classification Search
CPC ................. B60S 1/3867; B60S 1/3868; B60S 2001/4054
See application file for complete search history.

(56) References Cited

U.S. PATENT DOCUMENTS

| 2004/0074037 | A1 | 4/2004 | Op't Roodt | |
| 2006/0064842 | A1* | 3/2006 | Verelst | B60S 1/38 15/256.5 |
| 2006/0272119 | A1* | 12/2006 | Genet | B60S 1/4038 15/250.32 |
| 2010/0017994 | A1* | 1/2010 | Boland | B60S 1/3868 15/250.3 |
| 2012/0167326 | A1* | 7/2012 | Egner-Walter | B60S 1/3805 15/250.01 |

FOREIGN PATENT DOCUMENTS

| DE | 102009029458 A1 * | 3/2011 | ............ B60S 1/3868 |
| DE | 102010030880 A1 | 1/2012 | |
| EP | 2143603 A2 | 1/2010 | |

OTHER PUBLICATIONS

DE102009029458A1 (machine translation), 2011.*
International Search Report for PCT/IB2012/054109 filed on Aug. 13, 2012.

* cited by examiner

*Primary Examiner* — Andrew A Horton
(74) *Attorney, Agent, or Firm* — Notaro, Michalos & Zaccaria P.C.

(57) ABSTRACT

A connection system that is used for connecting a wiper blade to a wiper arm. The system includes a bracket, an adapter pivotally attached to the bracket and the free end of the wiper arm. The system also includes a first locking part and a second locking part, such that the first locking part fixes the arm on to the bracket and the second locking part fixes the arm on to the adapter.

13 Claims, 5 Drawing Sheets

WINDSCREEN WIPER

RELATED TECHNICAL FIELD

The present invention relates to an attachment device for connecting a windscreen wiper blade to a wiper arm in vehicles such as automobiles.

PRIOR ART

A windscreen wiper device comprising an elastic wiper profile for wiping the surface of the windscreen, an elongated, resilient carrier frame for supporting said profile and a connecting device for an oscillating wiper arm have been known for a long time.

In order to ensure the proper contact between the wiper profile and the windscreen surface at every point, the wiper blade should be pivotally connected to the free end of the wiper arm so as to rotate around a pivot axis. Such a rotatable connection is required to be secure enough at one hand to resist the forces acting in all three directions, and on the other hand, should be easily detachable to enable the end user to replace the wiper blade when needed. One of the arm-blade connections meeting said requirements is the bayonet design.

EP1568559 discloses such an arm-blade connection which is realized by an adapter part that can be attached to a bracket fixed on the wiper blade by pivotally engaging pin-shaped lateral protrusions of said bracket in holes provided in said adapter part. According to the invention, the holes have a closed circumference to enhance the retention of the arm onto the bracket/adapter in horizontal and vertical directions whereas the longitudinal retention is enhanced by a resilient tongue provided on the adapter engaging in a correspondingly shaped hole provided in the arm. The disclosed adapter part can be mounted onto the bracket by resiliently stretching the side walls outwards. However in case the user applies excessive force during assembly, the adapter may lose its function.

US2006272119 discloses an adapter for connecting a U-shaped arm with a carrier frame of a conventional type wiper blade. The disclosed adapter comprises a resilient tongue engaging in a hole in said oscillating arm to lock with the arm in the longitudinal direction. The lateral surfaces of the arm and the adapter surrounding each other enhance the vertical locking between the arm and the adapter. However, the adapter-blade, therefore the arm-blade connection is not safe against the forces that may act in the vertical direction. The adapter is pivotally mounted on the pin of the carrier frame by means of a recess formed in a downwardly extending portion of the adapter. The recess is provided with an insertion opening such that the adapter can be snapped onto the pin by a simple vertical movement. Although such a design highly facilitates the assembly of the arm with the blade, it is not robust since the arm is fastened to the blade only by means of the tight fitting between the resilient arms of the adapter and the pin of the carrier frame. Therefore, there is a high risk of arm-blade detachment during operation.

FR2890925 discloses an adapter which can be attached to the bracket in a vertical direction. Circular protrusions serving as pins are situated on the two parallel lateral surfaces of the bracket, and the articulated connection is realized by said protrusions being seated into the openings arranged on the two lateral surfaces of the adapter. Said openings have an open circumference formed by elastically deformable attachment portions such that said portions can deflect outwards during snapping onto the pin-like protrusions, and after assembly, they return elastically to their initial position and prevent the vertical movement of the pin-like protrusions through the opening. The connection between the arm is again realized by a resilient tongue provided on the adapter engaging in a corresponding hole provided on the arm.

This arm-blade connection can be easily mounted and dismounted thanks to the half open pin holes. However, as in the previous solution, the vertical locking of the arm and the blade and the adapter depends only on the tight-fitting of the pin into the pin bearings and thus the arm-blade connection is not safe.

In order to eliminate these disadvantages, by means of the present invention, a connection mechanism is realized, that enables the adapter to be easily fastened to the blade without being damaged during the mounting and that provides the arm and the blade to be locked in a safe manner against the forces in all directions.

SHORT DESCRIPTION OF THE INVENTION

In the present invention, a connection mechanism that provides the safe connection of the arm and the blade and the easy-attachment and detachment thereof is disclosed.

The connection mechanism according to the invention comprises first a bracket which is fixed at approximately the central region of the blade by preferably gripping the vertebra with its hook-shaped legs. A pin is disposed between the parallel side walls of the bracket and protrusions are provided on the outer surface of said side walls. The adapter on the other hand, is provided with two resilient arms extending downwards from the inner surface of its top wall and form an inverted U-shaped pin housing. This pin housing is snapped onto the pin located between the two side walls of the bracket and provides an articulated connection between the adapter and the bracket.

The free end of the arm which has a U-shaped form composed of a top and two side walls and a hole arranged on said top wall, is locked into engagement with the adapter as well as with the bracket as it is mounted onto the adapter.

The arm-adapter locking is realized by means of a resilient tongue provided on the adapter entering into the hole on the arm so as to secure the arm on the blade in the longitudinal direction.

A second locking which acts against forces in the vertical direction is provided between the arm and the bracket. According to the invention, this second locking is realized by means of at least one locking member located on the inner surface of the side wall of the arm, engaging with the protrusion on the outer surface of the bracket. In order to preserve the rocking motion between the arm and the bracket, at least one of the contact surfaces of this second locking components is provided in a curvilinear form. As a result, an improved connection is obtained between the arm and the blade which is resistant against the forces acting in all directions.

Figure 1:
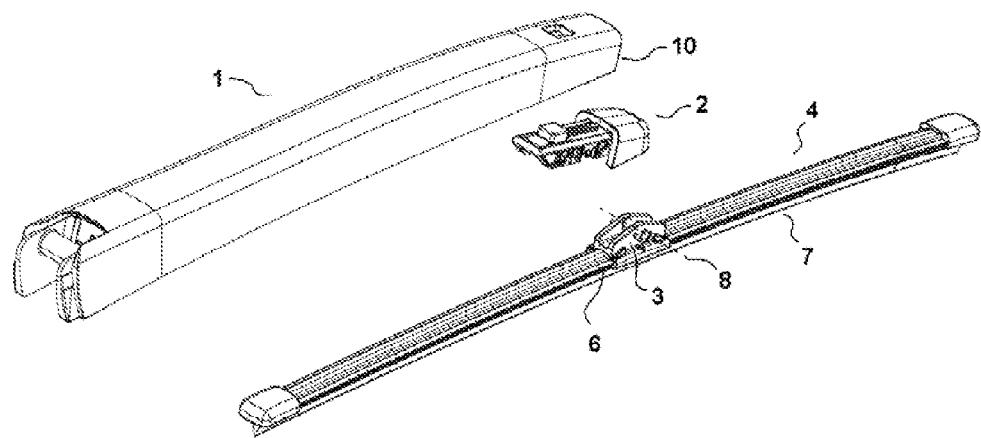
FIG. 1 is the exploded isometric view of the windscreen wiper of the present invention.

1 Wiper arm
2 Adapter
3,3' Bracket
4 Wiper blade
5 End caps
6 Vertebra
7 Wiper profile
8 Pivot axis
10,10' Wiper arm free end
11 Side walls of the wiper arm
12 Top wall of the wiper arm
13 Wiper arm hole
14 Front surface of the wiper arm
110 Inner surface of the side wall of the wiper arm free end
111,111' Locking members
112,112' Upper surface of the locking members
20 Adapter body
21 Head portion of the adapter
210 Abutment surface of the adapter
22 Side wall of the adapter body
23 Top wall of the adapter body
230 Inner surface of the top wall of the adapter
24 Tongue
25 Pin housing
251 Flexible extension of the pin housing
26 Side members
30 Bracket body
31 Side walls of the bracket
310 Outer surface of the side walls of the bracket
32 Bracket legs
33 Pin
34,34' Bracket protrusion
340,340' Lower surface of the bracket protrusion
400 Vertical direction
500 Longitudinal direction

DETAILED DESCRIPTION OF THE INVENTION

As shown in FIG. 1, the connection is used for connecting a wiper blade (4) having at least one elastomeric wiper profile (7) with a lip portion for wiping the glass surface, an arc-shaped resilient metal vertebra (6) and a bracket (3) fixed to the vertebra (6) at the longitudinal middle region, to a wiper arm (1) one end of which is connected to a motor in the vehicle so as to rotate around a pivot axis (8). The connection according to the present invention comprises said bracket (3), an adapter (2) connected to the bracket (3) so as to rotate around said pivot axis (8) and the free end (10) of the wiper arm (1) which is fastened to these two elements (2, 3).

Figure 2:
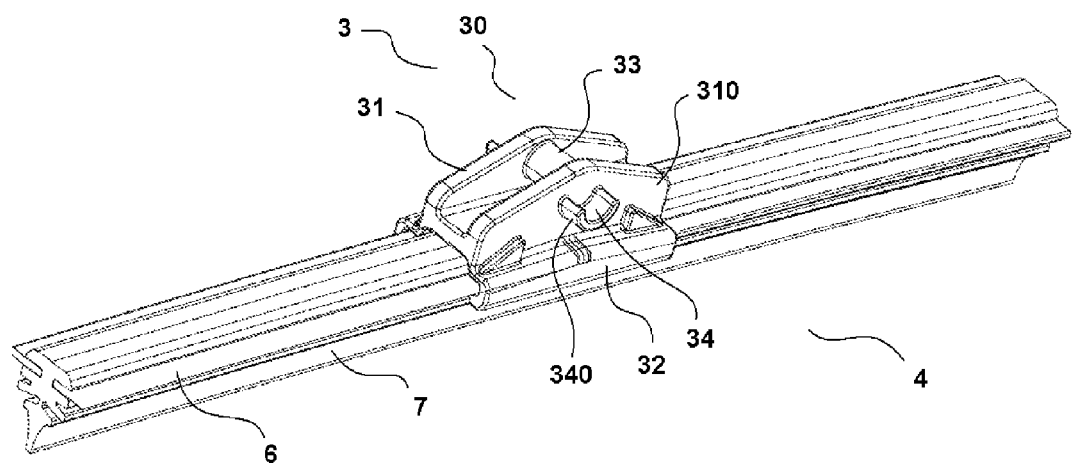
FIG. 2, is the isometric view of the blade with the bracket integrated thereon.

As shown in FIG. 2, the bracket (3) is fixed to the blade (4), preferably directly to the vertebra (6) by means of its hook-shaped legs (32). The body portion (30) above these legs (32) has preferably two parallel side walls (31). A pin (33) preferably having a circular cross-section extends between said two side walls (31) and joins them. At least one protrusion (34) is provided on the outer surface (310) of at least one, preferably both of the side walls (31). In the preferred arrangement of the present invention, the lower surface (340) of each protrusion (34) has a curvilinear form. However in different embodiments, said surfaces (340) may also have a flat form. Said protrusions (34) are preferably arranged in crescent-shaped with tops open; however, they can have different shapes provided that they do not obstruct the movement of the blade (4) on the windscreen.

Figure 3:
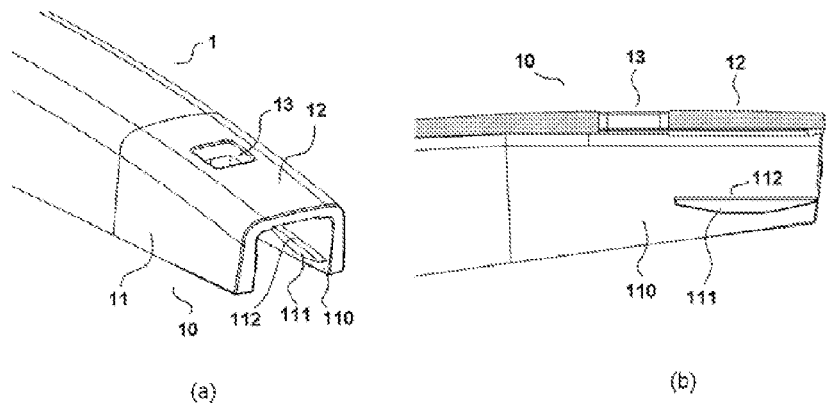
FIG. 3 a and b are the isometric and cross-sectional views of the wiper arm.

As shown in FIG. 3, the free end (10) of the wiper arm (1) is composed of two parallel side walls (11) and a top wall (12) joining these two (11). A hole (13) is arranged on the top wall (12) and is preferably formed as quadrangular. Inner surfaces (110) of at least one, preferably both of said side walls (11) are provided with at least one locking member (111). In the preferred arrangement of the present invention, said locking members (111) are provided so as to have a planar upper surface (112); however, in other embodiments of the invention, the locking members (111) may have circular or elliptical cross-sections.

Figure 4:
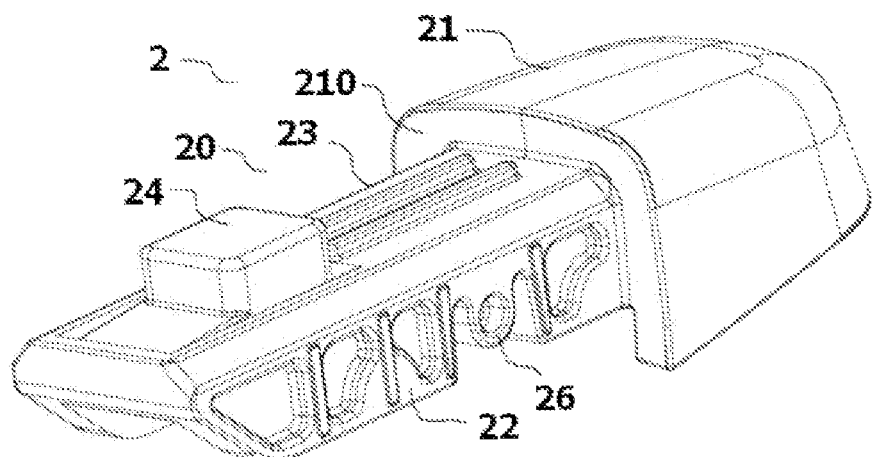
FIG. 4 a and b are the two different isometric views of the adaptor.
Figure 4:
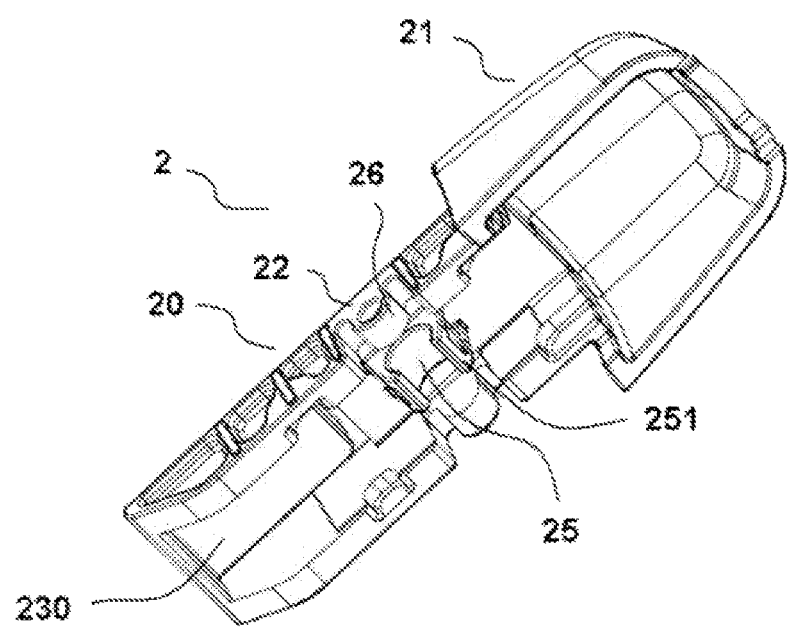

As shown in FIGS. 4a and 4b, the adapter (2) is composed of a head portion (21) and a body (20) with U-shaped cross-section which comprises two side walls (22) and a top wall (23). The head (21) has a protruding structure with respect to the body (20) so as to form an abutment surface (210) at the region where it intersects the body (20). The top wall (23) of the body (20) has one or more than one tongues (24). The tongue (24) is preferably quadrangular and designed so as to be inserted into the hole (13) on the free end (10) of the arm (1). A pin housing (25) that grips the pin (33) on the bracket (3) in the assembled state is formed on the inner surface (230) of the top wall (20). The pin housing (25) is in the form of an inverted U and is preferably formed by means of two arc-shaped flexible extensions (251) that extend downwards.

Preferably, side members (26) are arranged on both side walls (22) of the body (20) of the adapter (2) in order to bear the protrusions (34) of the bracket (3). Said side members (26) have preferably circular cross-sections and aligned with the pin housing (25).

Figure 5:
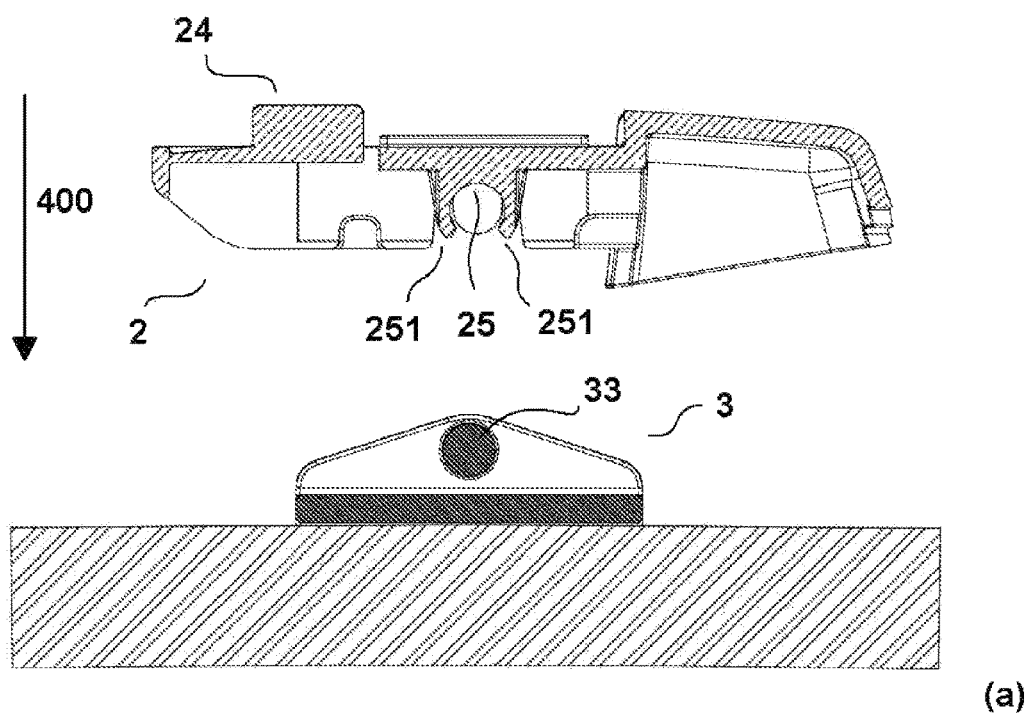
FIG. 5a is the cross-sectional view showing the assembly of the adapter to the bracket.
FIG. 5b is the cross-sectional view showing the adapter mounted on the bracket.
FIG. 5c is the side view showing the adapter mounted on the bracket.
Figure 5:
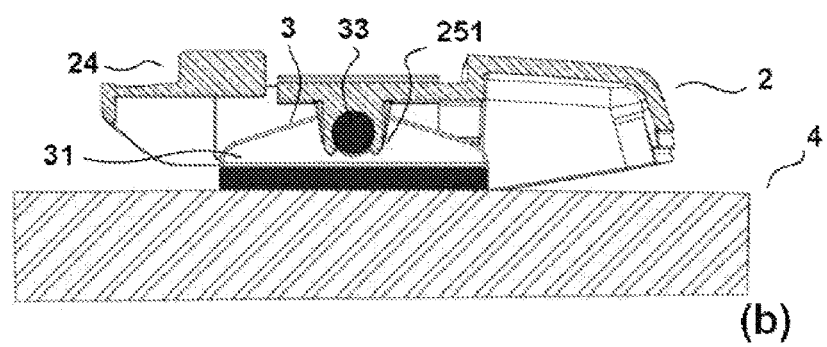
Figure 5:
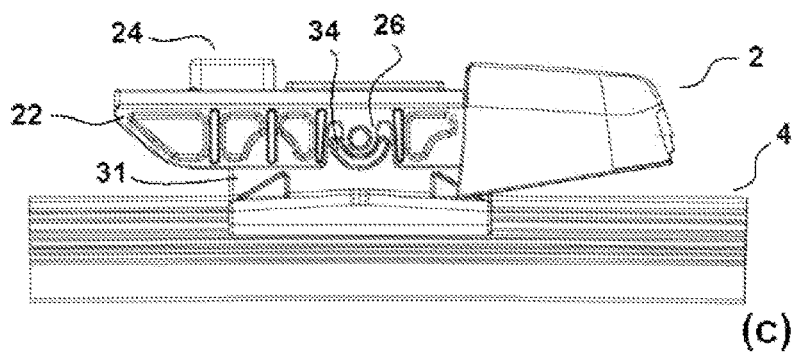
Figure 6:
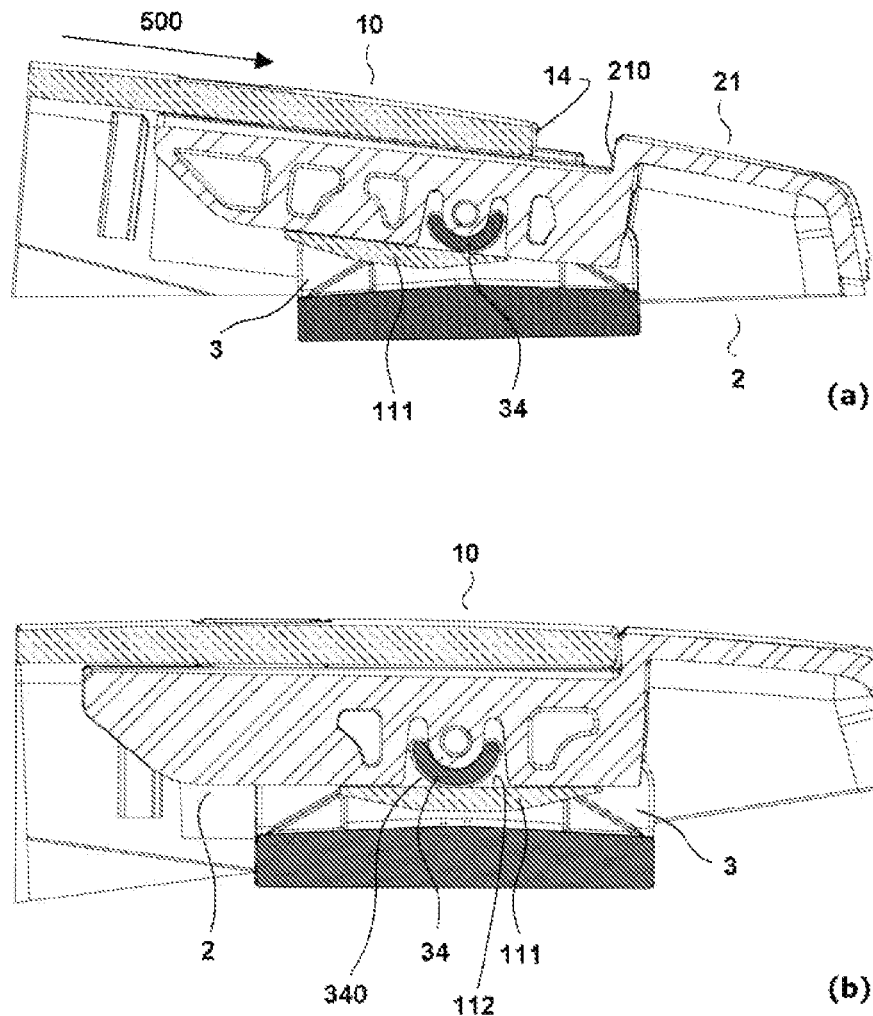
FIG. 6a is the cross-sectional view showing the assembly of the arm to the adapter.
FIG. 6b is the cross-sectional view showing the arm mounted on the adapter.

FIGS. 5 and 6 show the assembly process of the wiper arm (1) and the wiper blade (4).

FIG. 5a shows the connection of the adapter (2) to the bracket (3) that is fixed on the blade (4). In order to mount the adapter (2) onto the bracket (3), the adapter is moved in the vertical direction (400) as shown in the figure. During the assembly, the flexible extensions (251) of the adapter (2) stretch outwards and open, then surround the pin (33) at the center of the bracket (3). Thus, by means of the pin (33) being seated into the pin housing (25) as shown in FIG. 5b, the adapter (2) is connected to the blade (4) in an articulated manner. In the assembled state as shown in FIG. 5c, side walls (22) of the adapter (2) surround the side walls (31) of the bracket (3). Preferably in the assembled stated, the protrusions (34) of the bracket (3) and the side members (26) of the adapter (2) stands on each other.

FIG. 6a shows the assembly of the arm (1) on the blade. As shown, the assembly is realized by sliding the arm (1)

over the adapter (2) in the longitudinal direction (500) until its front surface (14) bears against the abutment surface (210) of the adapter. As the arm is slid this way, the locking members (111) on side walls pass underneath the lateral protrusions (34) of the bracket (3). Thus, a first locking is obtained between the free end of the arm and the bracket. Although it is not shown in FIG. 6, during this movement of the arm on the adapter, the tongue (24) engages in the hole (13) of the arm, providing a second locking between the free end of the arm and the adapter.

FIG. 6b shows the inventive connection in the assembled state. As shown, the free end of the arm (10) is fastened to the bracket. As a result, any possibility of detachment of the arm and the blade due to forces in the vertical direction is eliminated. Furthermore, thanks to the planar upper surfaces (112) of the locking members (111) and the curvilinear lower surfaces (340) of the protrusions (34) resting on them (112), the rocking motion between the arm and the bracket is preserved. As a result, the rotational movement between the arm (1) and the blade (4) is not limited.

Figure 7:
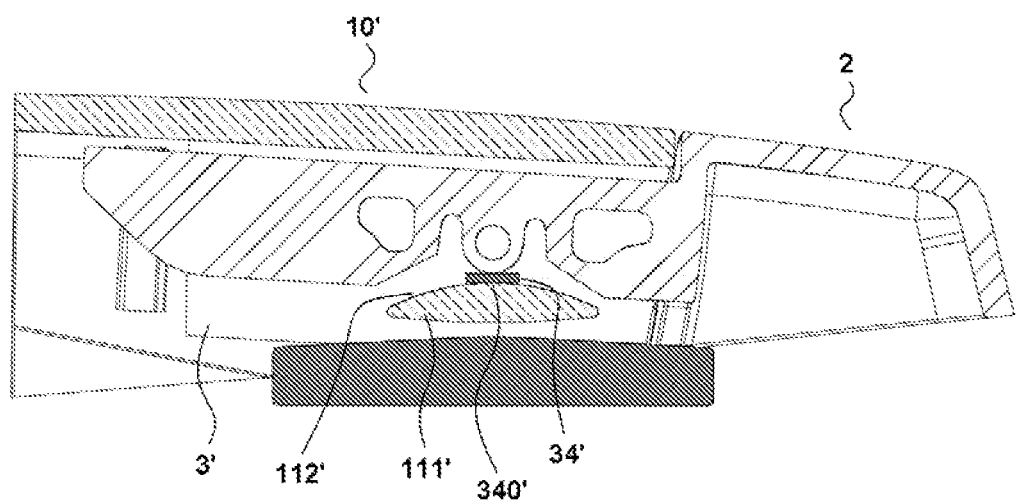
FIG. 7 is the cross-sectional view of an alternative arrangement of the connection device of the present invention.

FIG. 7 shows an alternative embodiment of the wiper connection of the present invention. In this embodiment, the lower surfaces (340') of the protrusions (34') on the bracket (3') are flat. In order to obtain the rocking motion between the free end (10) of the arm (1) and the bracket (3), the surface (112') of the locking members (111') that contacts the lower surfaces (340') has a curvilinear shape. The shapes of the locking members (111, 111') and the protrusions (34, 34') of the bracket (3, 3') are not limited to the shapes in the figures and various designs can be used as long as they do not limit the movement of the wiper.

The invention claimed is:

1. A connection device for connecting a wiper blade (4) having at least an elastomeric wiper profile (7) with a lip portion for wiping the glass surface, an arc-shaped, resilient carrier element (6) and a bracket (3) fixed to the blade (6) at the longitudinal middle region, to an oscillating wiper arm (1), so as to rotate around a pivot axis (8), the device comprising at least said bracket (3), an adapter (2) pivotally attached to the bracket (3) and a free end (10) of the wiper arm (1), the device comprises a first locking means (34, 111, 34', 111') and a second locking means (13, 24), such that said first locking means (34, 111, 34', 111') fixes the arm on to the bracket (3) and the second locking means (13, 24) fixes the arm on to the adapter (2), wherein the connection device comprises side members (26) arranged on side walls (22) on a body (20) of the adapter (2) so as to bear protrusions (34) of the bracket (3) and defining a semi-circular peripheral line such that said protrusions (34) in the form of crescent shape members partially surround said semi-circular peripheral line and wherein said protrusions (34) are allowed a certain amount of free space in opposite directions along said semi-circular peripheral line in response to rotational movement of said side members (26), wherein the first locking means comprises the protrusions.

2. A connection device as in claim 1, characterized in that said first locking means (34, 111) comprises the protrusions (34) provided on the side walls (31) of the bracket (3) so as to protrude outwards, and a locking member (111) provided on at least one side wall (11) of the free end (10) of the arm (1) so as to protrude inwards and to be engaged with the said protrusion (34).

3. A connection device as in claim 2, characterized in that contact surfaces of said first locking means (34, 111) engaging with each other comprises lower surfaces (340) of said protrusions (34) and the upper surface (112) of said locking member (111).

4. A connection device as in claim 3, characterized in that at least one of said contact surfaces (340, 112) has a curvilinear form so that the free end (10) of the arm (1) can be fixed to the bracket (3) so as to rotate around said pivot axis (8).

5. A connection device as in claim 4, characterized in that the lower surfaces (340) of the protrusions (34) have a curvilinear form and the upper surface (112) of the locking member (111) of the arm (1) is flat.

6. A connection device as in claim 1, characterized in that the said second locking means (13, 24) comprises at least a hole (13) arranged on the free end (10) of the arm (1) and at least a tongue-shaped protrusion (24) provided on the adapter (2) so as to be seated into the said hole (13).

7. A connection device as in claim 1, characterized in that the said adapter (2) comprises a head portion (21) and the body (20) having a U-shaped cross-section comprising the side walls (22) and a top wall (23).

8. A connection device as in claim 7, wherein the head portion (21) has a protruding structure with respect to the body (20) so as to form an abutment surface (210) at the region where it intersects the body (20).

9. A connection device as in claim 1, characterized in that the articulated connection of the said bracket (3) and the adapter (2) is obtained by means of a pin (33) provided on the bracket (3) and a pin housing (25) formed on the adapter (2), wherein the said pin (33) is seated.

10. A connection device as in claim 9, characterized in that the said pin housing (25) is formed by means of two arc-shaped flexible extensions (251) that extend preferably from an inner surface (230) of the top wall (23) of the adapter (2).

11. A connection device as in claim 10, characterized in that the said housing (25) has an open bottom and the said flexible extensions (251) have a structure that stretches outwards to enable them to grip the pin (33) in order to mount the said adapter (2) onto the said bracket (3) in the vertical direction (400).

12. A connection device as in claim 1, characterized in that the free end (10) of the arm (1) is slid over the adapter in a longitudinal direction (500) until its front surface (14) contacts an abutment surface (210) of the adapter (2) so that the said arm (1) can be locked with the said adapter (2) and the bracket (3).

13. A connection device as in claim 1, characterized in that the said side members (26) have circular cross-sections.

* * * * *